United States Patent
Natori et al.

(10) Patent No.: US 12,101,203 B2
(45) Date of Patent: Sep. 24, 2024

(54) RELAY DEVICE, COMMUNICATION NETWORK SYSTEM, AND COMMUNICATION CONTROL METHOD

(71) Applicant: Nissan Motor Co., Ltd., Kanagawa (JP)

(72) Inventors: Kiyoshi Natori, Kanagawa (JP); Takashi Matsumoto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/632,425

(22) PCT Filed: Oct. 19, 2020

(86) PCT No.: PCT/JP2020/039302
§ 371 (c)(1),
(2) Date: Feb. 2, 2022

(87) PCT Pub. No.: WO2022/085055
PCT Pub. Date: Apr. 28, 2022

(65) Prior Publication Data
US 2023/0261898 A1   Aug. 17, 2023

(51) Int. Cl.
*H04L 12/46* (2006.01)
*H04L 1/00* (2006.01)
*H04L 12/40* (2006.01)

(52) U.S. Cl.
CPC ............ *H04L 12/46* (2013.01); *H04L 1/0061* (2013.01); *H04L 12/4013* (2013.01); *H04L 2012/40215* (2013.01)

(58) Field of Classification Search
CPC ................. H04L 12/46; H04L 12/4013; H04L 12/40169; H04L 12/4625; H04L 2012/40215; H04L 2012/40273
See application file for complete search history.

(56) References Cited

U.S. PATENT DOCUMENTS 9,413,628 B2 * 8/2016 Higashihara ............ H04L 43/10
10,756,930 B2   8/2020 Haga et al.
(Continued)

FOREIGN PATENT DOCUMENTS

| CN | 107005412 A | 8/2017 |
| CN | 108370342 A | 8/2018 |
| WO | 2017/203902 A1 | 11/2017 |

*Primary Examiner* — Rasheed Gidado
(74) *Attorney, Agent, or Firm* — Osha Bergman Watanabe & Burton LLP

(57) ABSTRACT

A CGW (7) connected to a first communication network (1) and a fifth communication network (5). The second communication network uses a communication protocol different from a communication protocol of the first communication network (1). The CGW (7) receives, from the first communication network (1), CAN frames each including a data field storing control information (CD) to be transmitted from the first communication network (1) to a second communication network (5), a CAN ID for identifying the control information (CD), and an error detection code (EC) stored in the data field and calculated on the basis of the control information (CD) and the CAN ID. The CGW (7) generates an FD frame including a data field storing the CAN frames and a CAN FD ID indicating that the CAN frames are stored in the data field, and transmits the generated FD frame to the fifth communication network (5).

7 Claims, 7 Drawing Sheets

(56) References Cited

U.S. PATENT DOCUMENTS

| | | | |
|---|---|---|---|
| 11,557,365 B2* | 1/2023 | Schat | G11C 29/42 |
| 2003/0115359 A1* | 6/2003 | Ishibashi | H04L 12/4625 |
| | | | 709/238 |
| 2014/0064199 A1* | 3/2014 | Pan | H04W 72/02 |
| | | | 370/329 |
| 2014/0369179 A1* | 12/2014 | Ueda | H04L 12/66 |
| | | | 370/392 |
| 2017/0118038 A1* | 4/2017 | Ujiie | H04B 1/3822 |
| 2017/0324557 A1 | 11/2017 | Morita et al. | |
| 2019/0058613 A1* | 2/2019 | Maeda | H04L 12/4625 |
| 2019/0068407 A1 | 2/2019 | Haga et al. | |
| 2020/0351123 A1 | 11/2020 | Haga et al. | |

\* cited by examiner

RELAY DEVICE, COMMUNICATION NETWORK SYSTEM, AND COMMUNICATION CONTROL METHOD

TECHNICAL FIELD

The present invention relates to a relay device, a communication network system, and a communication control method for performing data communication between a plurality of communication networks using different communication protocols.

BACKGROUND ART

Patent Document 1 discloses an in-vehicle network system that communicates data frames between a plurality of communication networks using different communication protocols such as CAN (Controller Area Network) and Ethernet (registered trademark). The in-vehicle network system of Patent Document 1 includes a C-ECU connected to a first network using CAN and an E-ECU connected to a second network using Ethernet. The ECU (Electronic Control Unit) is an electric control unit that controls various in-vehicle devices. A gateway device is connected between the first network and the second network. When transmitting a CAN data frame generated by the C-ECU to the E-ECU, the gateway device transmits an Ethernet data frame, storing a plurality of CAN data frames therein.

PRIOR ART DOCUMENT

Patent Document

[Patent Document 1] International Publication No. 2017/203902

SUMMARY OF THE INVENTION

Problem to be Solved by the Invention

In the CAN communication protocol, an error detection code is added to a data frame in order to detect and correct a code error (error) generated in the data frame. However, Patent Document 1 does not disclose how to perform error detection for the CAN data frame stored in the Ethernet data frame in the in-vehicle network system.

In order to solve the problem, the present invention provides a relay device, a communication network system, and a communication control method, which are capable of appropriately detecting data errors when performing data communication between a plurality of communication networks using different communication protocols.

Means for Solving Problem

The present invention solves the above problem by a relay device connected to a first communication network and a second communication network, the second communication network using a communication protocol different from a communication protocol of the first communication network. The relay device is configured to: receive first data from the first communication network, the first data including a first payload, a first data ID, and an appropriate error detection code calculated on a basis of control information stored in the first payload and the first data ID; generate second data including a second payload storing the first data and a second data ID indicating that the first data is stored in the second pay load; and transmit the generated second data to the second communication network.

Effect of the Invention

According to the present invention, each of the first data stored in the second data includes the appropriate error detection code calculated on the basis of the first data ID and the control information, so that it is possible to perform error detection for each first data.

BRIEF DESCRIPTION OF DRAWING(S)

MODE(S) FOR CARRYING OUT THE INVENTION

An embodiment of the present invention will be described below with reference to the drawings.

In the present embodiment, a relay device, a communication network system, and a communication control method according to the present invention will be described with reference to an example in which the relay device, the communication network system, and the communication control method are applied to an in-vehicle network system installed in an automobile (also referred to as a vehicle). An in-vehicle communication network system CNW according to the present embodiment is a network system in which a plurality of communication networks using different communication protocols such as CAN, CAN FD, and Ethernet are mixed. CAN FD is a communication protocol that is upward compatible with CAN, and provides a larger amount of data communication per unit time (communication speed) than that of CAN. Ethernet is a communication network used for LAN (Local Area Network) and the like, and provides a larger amount of data communication per unit time than that of CAN FD.

Figure 1:
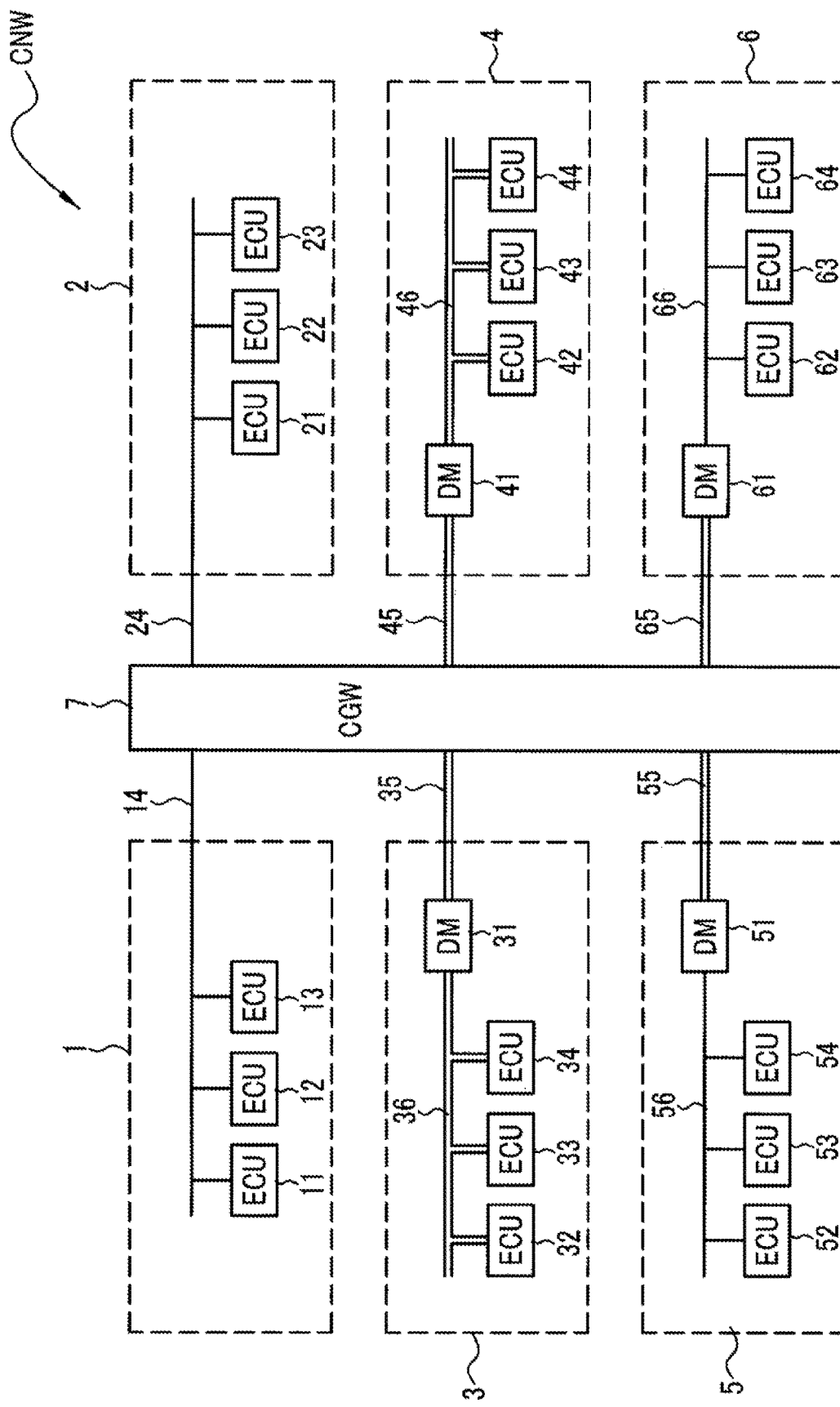
FIG. 1 is a configuration diagram of an in-vehicle communication network system to which a relay device, a communication network system, and a communication control method according to the present invention are applied.

FIG. 1 is a block diagram illustrating a configuration of the in-vehicle communication network system CNW according to the present embodiment. The in-vehicle communication network system CNW includes a first communication network 1, a second communication network 2, a third communication network 3, a fourth communication network 4, a fifth communication network 5, a sixth communication network 6, and a CGW (Central Gateway) 7 connected to the first communication network 1 to the sixth communication network 6. The first communication network 1 to the sixth communication network 6 constitute a plurality of control groups corresponding to basic configurations into which the configuration of the vehicle is divided. Each control group is also referred to as a domain. Examples of domains include, as well as a multimedia domain for controlling information presentation in the vehicle, a power train domain for controlling the engine and the like, a chassis domain for controlling the steering mechanism and the like, a body domain for controlling the power window and the like, and an ADAS (Advanced Driver-Assistance System) domain for performing autonomous driving control. Some of the first communication network 1 to the sixth communication network 6 correspond to examples of a first communication network and a second communication network of the present invention. Note that the number of communication networks constituting the in-vehicle communication network system CNW is not limited to six.

The first communication network 1 includes an ECU 11, an ECU 12, and an ECU 13. The ECUs 11 to 13 are connected to the CGW 7 via a CAN bus 14 through which data communication is performed according to the CAN communication protocol. The ECUs 11 to 13 are electric control units that control in-vehicle devices installed in the vehicle. Although not illustrated in detail, the ECUs 11 to 13 each include a controller and a communication circuit. The controller includes a CPU, a ROM in which a control program executed by the CPU is stored, a RAM used as a work area for the control program, and the like. The controller functions as the ECU by the CPU executing the control program. The communication circuit is controlled by the controller to communicate between the controller and the CAN bus 14.

To the ECUs 11 to 13, the in-vehicle devices such as sensors or actuators (not illustrated) are connected. The ECUs 11 to 13 each acquire, from a sensor connected thereto, sensor information indicating the detection result from the sensor, and generates a CAN data frame (hereinafter, also referred to as a CAN frame) storing control information including the acquired sensor information. The CAN frames generated by the ECUs 11 to 13 are transmitted to the CGW 7 via the CAN bus 14. Further, each of the ECUs 11 to 13 receives a CAN frame from the CGW 7 via the CAN bus 14, and controls the in-vehicle device such as an actuator on the basis of the control information stored in the received CAN frame. Some of the ECUs 11 to 13 correspond to examples of a first electric control unit and a second electric control unit of the present invention.

The second communication network 2 includes an ECU 21, an ECU 22, and an ECU 23. The ECUs 21 to 23 are connected to the CGW 7 via a CAN bus 24 through which data communication is performed according to the CAN communication protocol. Note that the ECUs 21 to 23 and the CAN bus 24 of the second communication network 2 have the same configurations as the ECUs 11 to 13 and the CAN bus 14 of the first communication network 1, and thus detailed description thereof will be omitted.

The third communication network 3 includes a DM (Domain Master) 31 and an ECU 32, an ECU 33, and an ECU 34. The DM 31 is connected to the CGW 7 via an FD bus 35 through which data communication is performed according to the CAN FD communication protocol. Further, the ECUs 32 to 34 are connected to the DM 31 via an FD bus 36 through which data communication is performed according to the CAN FD communication protocol.

The ECUs 32 to 34 are electric control units that control the in-vehicle devices installed in the vehicle, as with the ECUs 11 to 13 of the first communication network 1, and each include a controller and a communication circuit. The ECUs 32 to 34 each acquire, from a sensor connected thereto, sensor information indicating the detection result from the sensor, and generates a CAN FD data frame (hereinafter, also referred to as an FD frame) storing control information including the acquired sensor information. The FD frames generated by the ECUs 32 to 34 are transmitted to the DM 31 via the FD bus 36. Further, each of the ECUs 32 to 34 receives an FD frame from the DM 31 via the FD bus 36, and controls the in-vehicle device such as an actuator on the basis of the control information stored in the received FD frame. Some of the ECUs 32 to 34 correspond to examples of the first electric control unit and the second electric control unit of the present invention.

The DM 31 is a relay device that relays communication between the CGW 7 and the ECUs 32 to 34, and includes a controller and a communication circuit, as with the ECU. The DM 31 communicates the FD frame(s) with the ECUs 32 to 34 via the FD bus 36. Further, the DM 31 communicates the FD frame(s) with the CGW 7 via the FD bus 35. The DM 31 corresponds to an example of the relay device according to the present invention.

The fourth communication network 4 includes a DM 41, an ECU 42, an ECU 43, and an ECU 44. The DM 41 is connected to the CGW 7 via an FD bus 45 through which data communication is performed according to the CAN FD communication protocol. Further, the ECUs 42 to 44 are connected to the DM 41 via an FD bus 46 through which data communication is performed according to the CAN FD communication protocol. Note that the DM 41, the ECUs 42 to 44, and the FD buses 45 and 46 of the fourth communication network 4 have the same configurations as the DM 31, the ECUs 32 to 34, and the FD buses 35 and 36 of the third communication network 3, and thus detailed description thereof will be omitted.

The fifth communication network 5 includes a DM 51, an ECU 52, an ECU 53, and an ECU 54. The DM 51 is connected to the CGW 7 via an FD bus 55 through which data communication is performed according to the CAN FD communication protocol. Further, the ECUs 52 to 54 are connected to the DM 51 via a CAN bus 56 through which data communication is performed according to the CAN communication protocol.

The ECUs 52 to 54 are electric control units that control the in-vehicle devices installed in the vehicle, as with the ECUs 11 to 13 of the first communication network 1, and each include a controller and a communication circuit. Each of the ECUs 52 to 54 acquires, from a sensor connected thereto, sensor information indicating the detection result from the sensor, and generates a CAN frame storing control information including the acquired sensor information. The CAN frames generated by the ECUs 52 to 54 are transmitted to the DM 51 via the CAN bus 56. Further, each of the ECUs 52 to 54 receives a CAN frame from the DM 51 via the CAN bus 56, and controls the in-vehicle device such as an actuator on the basis of the control information stored in the received CAN frame. Some of the ECUs 52 to 54 correspond to examples of the first electric control unit and the second electric control unit of the present invention.

The DM 51 is a relay device that relays communication between the CGW 7 and the ECUs 52 to 54, and includes a controller and a communication circuit, as with the DM 31 of the third communication network 3. The DM 51 communicates the CAN frames with the ECUs 52 to 54 via the CAN bus 56. Further, the DM 51 communicates the FD frame with the CGW 7 via the FD bus 55. When transmitting the CAN frames generated by the ECUs 52 to 54 to the first communication network 1 or the second communication network 2, the DM 51 transmits the FD frame to the CGW 7, storing at least one of the CAN frames therein. The DM 51 corresponds to an example of the relay device according to the present invention.

The sixth communication network 6 includes a DM 61, an ECU 62, an ECU 63, and an ECU 64. The DM 61 is connected to the CGW 7 via an FD bus 65 through which data communication is performed according to the CAN FD communication protocol. Further, the ECUs 62 to 64 are connected to the DM 61 via a CAN bus 66 through which data communication is performed according to the CAN communication protocol. Note that the DM 61, the ECUs 62 to 64, the FD bus 65, and the CAN bus 66 of the sixth communication network 6 have the same configurations as the DM 51, the ECUs 52 to 54, the FD bus 55, and the CAN bus 56 of the fifth communication network 5, and thus detailed description thereof will be omitted.

The CGW 7 is a relay device that relays data frames between the first to sixth communication networks 1 to 6, and includes a controller and a communication circuit, as with the DM 31 and the like. The CGW 7 communicates the CAN frames with the ECUs 11 to 13 via the CAN bus 14 of the first communication network 1. Further, the CGW 7 communicates the CAN frames with the ECUs 21 to 23 via the CAN bus 24 of the second communication network 2. The CGW 7 communicates the FD frame with the DM 31 via the FD bus 35 of the third communication network 3. Further, the CGW 7 communicates the FD frame with the DM 41 via the FD bus 45 of the fourth communication network 4. Further, the CGW 7 communicates the FD frame with the DM 51 via the FD bus 55 of the fifth communication network 5. The CGW 7 communicates the FD frame with the DM 61 via the FD bus 65 of the sixth communication network 6. In response to receiving from the DM 51 or 61 the FD frame storing the CAN frame(s), the CGW 7 acquires the CAN frame(s) from the FD frame, and transmits the acquired CAN frame(s) to the ECUs 11 to 13 of the first communication network 1 or the ECUs 21 to 23 of the second communication network 2.

Figure 2:
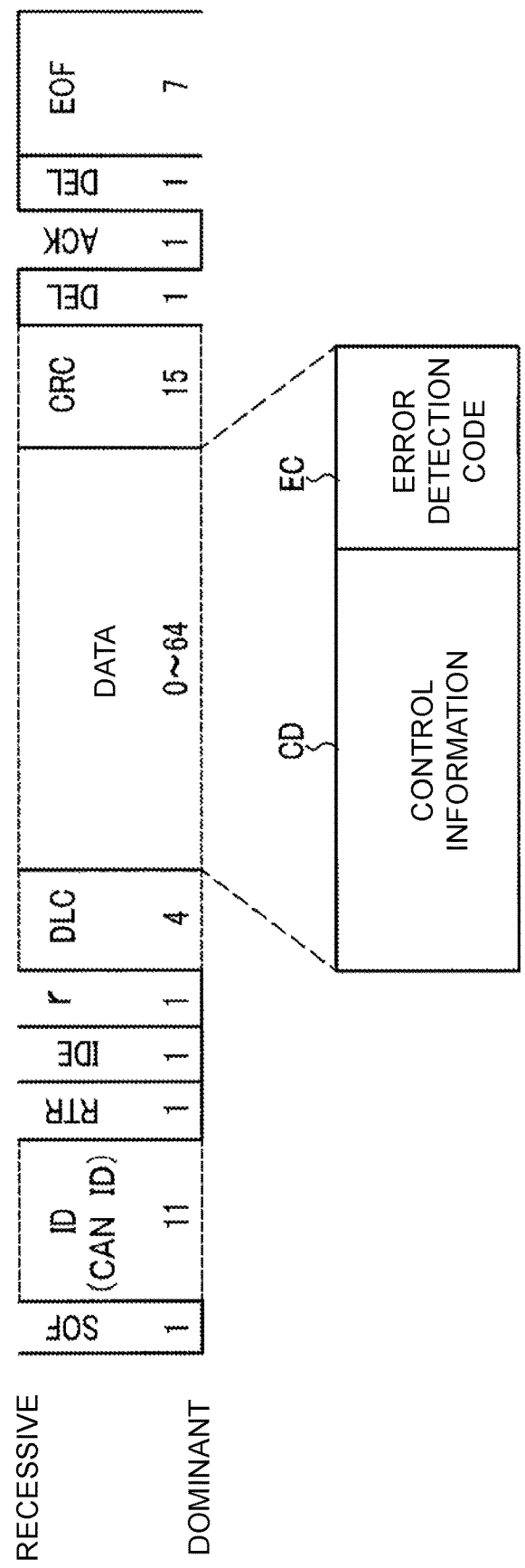
FIG. 2 is an explanatory diagram illustrating a structure of a CAN data frame.

Next, the structure of the CAN frame will be described. As illustrated in FIG. 2, the CAN frame includes an SOF (Start Of Frame) field, an ID (Identifier) field, an RTR (Remote Transmission Request) field, a DLC (Data Length Code) field, a data field, a CRC field, an ACK field, an EOF (End of Frame) field, and so on. The numerical value described in each field of FIG. 2 indicates the number of bits for each of the fields.

The SOF field indicates the beginning of the CAN frame. In the ID field, a CAN ID, which is an identifier indicating the type of data stored in the data field, is stored. The CAN ID is also referred to as a message ID. Note that, in CAN, when a plurality of ECUs start transmitting CAN frames at the same time, communication arbitration that prioritizes communication of a CAN frame having a smaller value of CAN ID is performed. In the DLC field, information indicating the size of the data in the subsequent data field is stored. In the CRC field, a cyclic redundancy check code used for detecting a communication error of the CAN frame is stored.

The specifications of the data to be stored in the data field are not specified in the CAN communication protocol. In the in-vehicle communication network system CNW according to the present embodiment, control information CD including sensor information acquired from the sensor connected to the ECU, and an error detection code EC, are stored in the data field. The error detection code EC is a code for detecting and correcting an error in the control information CD, and is provided separately from the CRC field used for error detection of the entire CAN frame in the present embodiment. The error detection code EC is calculated by each ECU that generates the CAN frame on the basis of the CAN ID and the control information CD. Note that the CAN frame in the present embodiment corresponds to first data of the present invention, and the CAN ID and the data field correspond to a first data ID and a first payload of the present invention.

Figure 3:
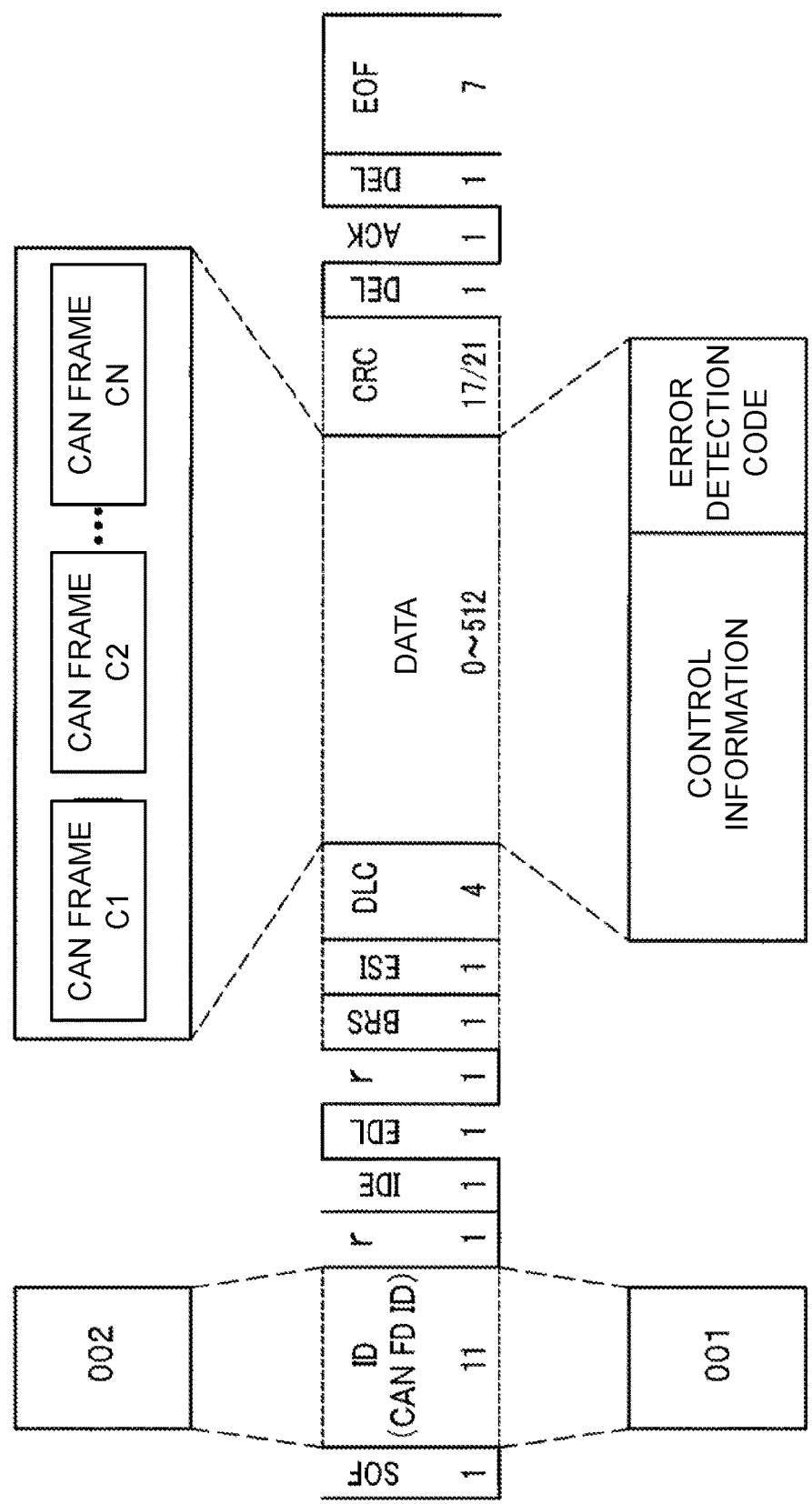
FIG. 3 is an explanatory diagram illustrating a structure of a CAN FD data frame.

Next, the structure of the FD frame will be described. As illustrated in FIG. 3, the FD frame includes an SOF field, an ID field, an EDL (Extended Data Length) field, a BRS (Bit Rate Switch) field, an ESI (Error State Indicator) field, a DLC field, a data field, a CRC field, an ACK field, an EOF field, and so on. The numerical value described in each field of FIG. 2 indicates the number of bits for each of the fields. In the FD frame, an EDL bit, a BRS bit, and an ESI bit are included in addition to the CAN frame, and also the data field is extended to 64 bytes. Further, in the ID field, a CAN FD ID, which is an identifier indicating the type of data stored in the data field, is stored.

When the FD frame is communicated between the ECUs connected to the FD bus, for example, the control information and the error detection code are stored in the data field, as with the CAN frame. Specifically, for example, when the FD frames are generated by the ECUs 32 to 34 connected to the FD bus 36 of the third communication network 3 and then transmitted to the ECUs 42 to 44 connected to the FD bus 46 of the fourth communication network 4, the control information and the error detection code are stored in the data field of the FD frame, as with the CAN frame. In this case, an ID indicating the type of control information, for example, "001" is assigned as the CAN FD ID.

Further, when the FD frame is transmitted from the ECU connected to the CAN bus to the ECUs via the FD bus, at least one CAN frame is stored in the data field. Specifically, for example, when the CAN frames are generated by the ECUs 11 to 13 connected to the CAN bus 14 of the first communication network 1 and then transmitted to the ECUs 52 to 54 of the fifth communication network 5, the CGW 7 stores at least one CAN frame in the data field of the FD frame and then transmits the CAN frame to the DM 51. In this case, an ID indicating that the CAN frame is stored in the data frame, for example, "002" is assigned as the CAN FD ID.

Note that transmitting an FD frame whose data field stores CAN frame(s) when the CAN frame(s) are transmitted to the ECUs connected to the FD bus is intended to prevent CAN ID(s) from being reassigned to the CAN frame(s). In other words, in conventional in-vehicle communication network systems, a CAN frame is converted into an FD frame and then transmitted, and the FD frame is converted into the CAN frame again by the DM or the like of a communication network which is the destination. In addition, when the FD frame is converted into the CAN frame, a CAN ID different from the previous one may be assigned. There is a problem from such reassignment of the CAN ID results in a high evaluation level of ASIL (Automotive Safety Integrity Level), which is used as an index for evaluating hazards in the Automotive Functional Safety Standard (ISO 26262), and therefore a high reliability requirement value for relay processing. In the present embodiment, a CAN frame or CAN frames is or are stored in an FD frame and then transmitted, and thus any CAN ID is not reassigned, so that it is possible to prevent the evaluation level of ASIL from increasing.

Figure 4:
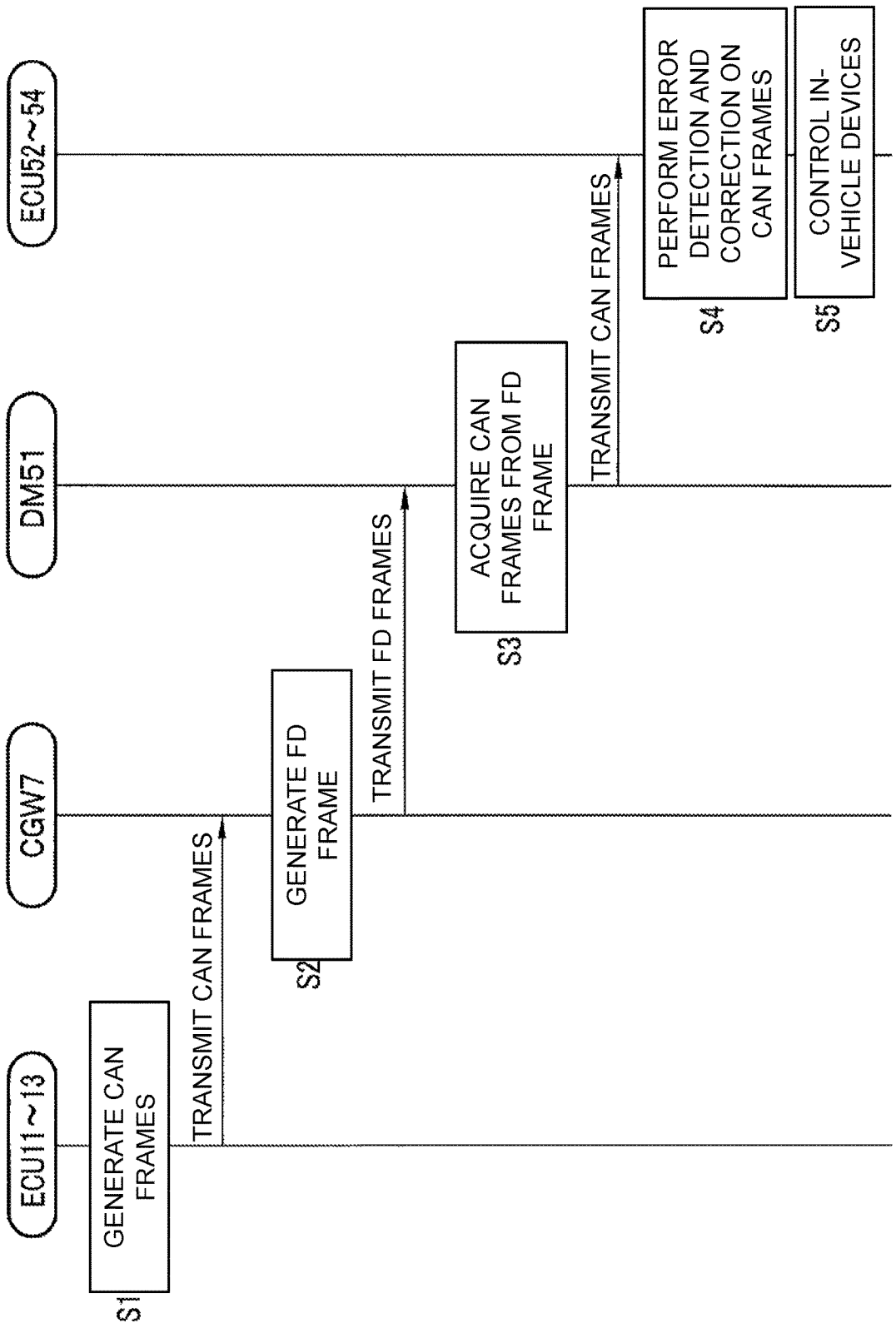
FIG. 4 is a sequence chart illustrating a procedure for transmitting a CAN frame from a communication network connected to a CAN bus to a communication network connected to a CAN bus.
Figure 5:
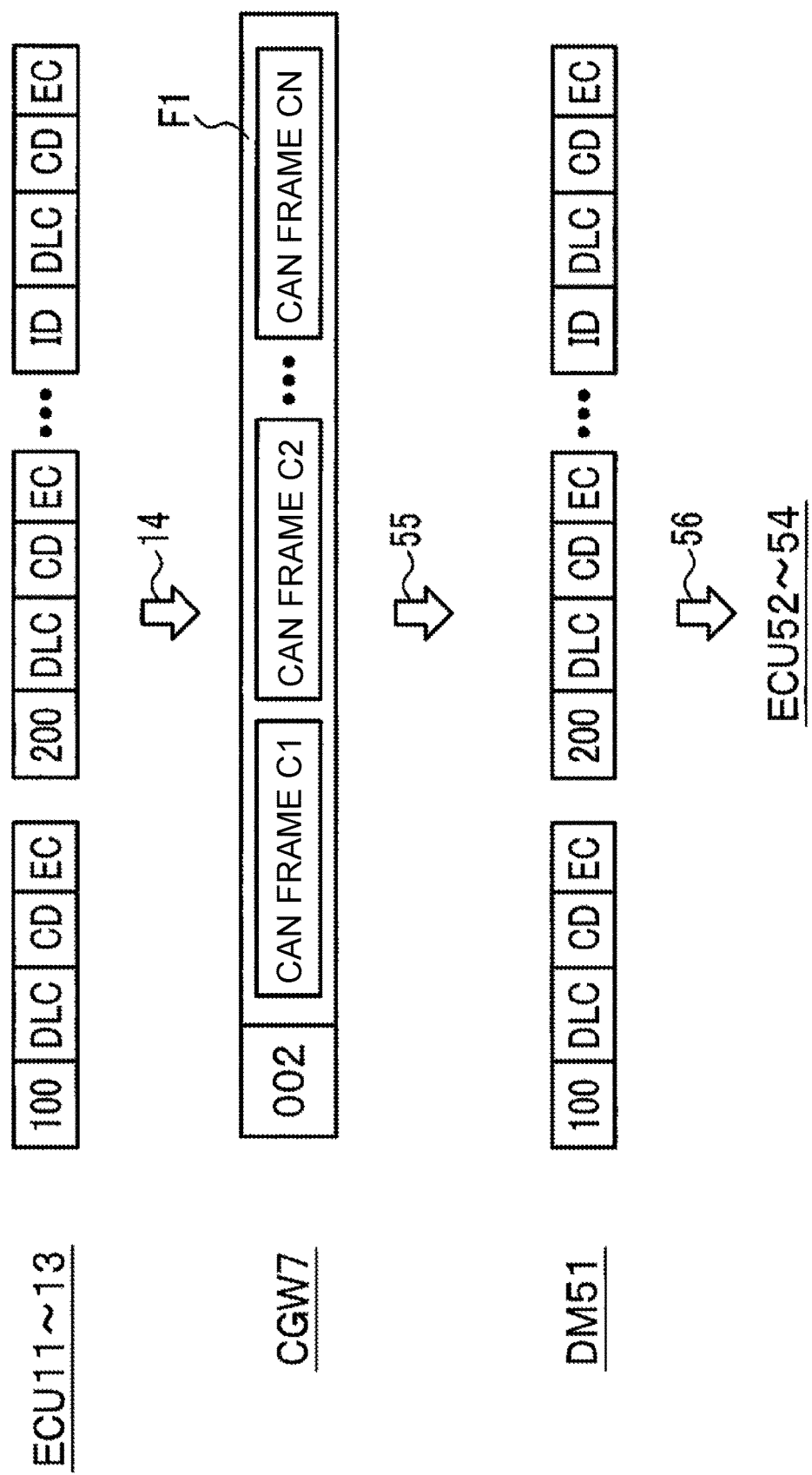
FIG. 5 is an explanatory diagram illustrating a procedure for transmitting a CAN frame from a communication network connected to a CAN bus to a communication network connected to a CAN bus.

Next, referring to the sequence chart of FIG. 4 and the explanatory diagram of FIG. 5, a procedure will be described in which the CAN frames generated by the ECUs 11 to 13 of the first communication network 1 are transmitted to the ECUs 52 to 54 of the fifth communication network 5. As illustrated in step S1 of FIG. 4, the ECUs 11 to 13 of the first communication network 1 acquire sensor information from the sensors, and generate, for example, CAN frames C1 to CN. Specifically, the ECUs 11 to 13 generate control information CD including the sensor information on the basis of the acquired sensor information, and set CAN IDs on the basis of the types of the sensor information and the like. In FIG. 4, "100" and "200" each indicate a CAN ID. Further, the ECUs 11 to 13 calculate error detection codes EC on the basis of the generated control information CD and the set CAN IDs. The ECUs 11 to 13 store the control information CD and the error detection codes EC in the data fields of the generated CAN frames C1 to CN, and transmit the generated CAN frames C1 to CN to the CGW 7 via the CAN bus 14.

The CGW 7 receives the CAN frames C1 to CN from the first communication network 1 via the CAN bus 14, and in step S2, generates an FD frame F1 whose data field storing the received CAN frames C1 to CN. Specifically, the CGW 7 assigns "002" to the FD frame F1 as a CAN FD ID indicating that at least one CAN frame is stored in the data field. Further, the CGW 7 groups the plurality of CAN frames C1 to CN on the basis of the ECUs which are the destinations of the CAN frames C1 to CN, the types of the stored control information CD, the transmission cycle of the CAN frames C1 to CN, and the like, and then generates an FD frame F1 for each of the groups of CAN frames. Further, the CGW 7 transmits the generated FD frames F1 to the DM 51 via the FD bus 55 of the fifth communication network 5.

The type of control information CD means that the control contents in which the control information CD is used are common or relevant. For example, in the case where the CAN frames C1 to CN are grouped according to the control of acceleration/deceleration of the vehicle, the control of the power train of the engine or the like and the control of the brake or the like have common or relevant control contents, and the CAN frames C1 to CN are grouped into the pieces of control information CD used for these controls. Further, the transmission cycle of the CAN frames C1 to CN means, for example, a transmission cycle for the case where the sensor information acquired from the sensor is transmitted at a predetermined time interval, and the CAN frames C1 to CN are grouped into the pieces of control information CD having the same or similar transmission cycle. Such transmission of the CAN frames C1 to CN grouped according to the destination ECUs, the types of control information CD, the transmission cycle, and the like makes it possible to reduce the transmission load of the in-vehicle communication network system CNW. Further, the related pieces of control information CD can be transmitted together, so that it is possible to perform the control by the destination ECUs appropriately and efficiently.

Further, the CGW 7 acquires only the "CAN ID", "DLC", "control information", and "error detection code" from each of the CAN frames C1 to CN, and stores them in the data field of the FD frame F1. "DLC" is used to determine the delimiter of the plurality of CAN frames C1 to CN stored in the data field. In this way, out of the large number of data constituting the CAN frames C1 to CN, only the data required by the destination ECU(s) is stored in the FD frame F1 and then transmitted, so that it is possible to reduce the transmission load of the in-vehicle communication network system CNW.

In response to receiving the FD frame F1 via the FD bus 55, the DM 51 of the fifth communication network 5 determines that at least one CAN frame is stored in the data field on the basis of the CAN FD ID. In step S3, the DM 51 acquires the CAN frames C1 to CN from the received FD frame F1. As described above, when the plurality of CAN frames C1 to CN are acquired from the data field of the FD frame F1, the delimiter between the CAN frames can be determined by using "DLC", so that it is possible to acquire the plurality of CAN frames C1 to CN appropriately. The DM 51 transmits the acquired CAN frames C1 to CN to the CAN bus 56 of the fifth communication network 5.

The ECUs 52 to 54 of the fifth communication network 5 receive the CAN frames C1 to CN necessary for controlling the in-vehicle devices on the basis of the CAN IDs of the CAN frames C1 to CN. Further, in step S4, the ECUs 52 to 54 detect and correct errors in the received CAN frames C1 to CN on the basis of the error detection codes EC. Further, in step S5, the ECUs 52 to 54 control the in-vehicle devices on the basis of the received control information CD of the CAN frames C1 to CN.

As described above, in the in-vehicle communication network system CNW according to the present embodiment, when CAN frames are transmitted from the first communication network 1 to the fifth communication network, the CGW 7 connected to the first communication network 1 and the fifth communication network 5 using a communication protocol different from that of the first communication network 1 receives from the first communication network 1 the CAN frames including a data field storing control information CD, a CAN ID for identifying the control information CD, and an error detection code EC stored in the data field and calculated on the basis of the control information CD and the CAN ID, and the CGW 7 generates an FD frame including a data field storing the CAN frames and a CAN FD ID indicating that the CAN frames are stored in the data field, and transmits the generated FD frame to the fifth communication network 5. As a result, each of the CAN frames stored in the FD frame has the error detection code EC calculated on the basis of the CAN ID and the control information CD, so that it is possible to perform error detection for each CAN frame and to perform appropriate vehicle control. Further, a CAN ID is not reassigned to any of the CAN frames, so that it is possible to prevent the evaluation level of ASIL from increasing.

Further, in the in-vehicle communication network system CNW according to the present embodiment, the CAN frames are grouped on the basis of the destination ECUs in the fifth communication network 5, the types of control information CD stored in the CAN frames, or the transmission cycle of the CAN frames from the first communication network 1, and are stored in the FD frame for each of the groups of CAN frames. As a result, it is possible to reduce the transmission load of the in-vehicle communication network system CNW. Further, the related control information CD can be transmitted together, so that it is possible to perform the control by the destination ECUs appropriately and efficiently.

Further, in the in-vehicle communication network system CNW according to the present embodiment, the CAN frame includes information on the size of the control information CD, so that each CAN frames can be acquired accurately and separately when the CAN frames are acquired from the FD frame.

Further, in the in-vehicle communication network system CNW according to the present embodiment, the fifth communication network 5 using CAN FD has a larger amount of data communication per unit time than the first communication network 1 using CAN. Therefore, even with the FD frame storing a plurality of CAN frames, the communication load does not increase or the communication speed does not decrease.

Further, the in-vehicle communication network system CNW according to the present embodiment includes the ECUs 11 to 13 connected to the first communication network 1, the ECUs 52 to 53 connected to the fifth communication network 5 using a communication protocol different from that of the first communication network 1, and the CGW 7 connected to the first communication network 1 and the fifth communication network 5. Further, the ECUs 11 to 13 of the first communication network 1 each generate CAN frame including a data field storing control information CD to be transmitted to the fifth communication network 5, a CAN ID for identifying the control information CD, and an error detection code EC stored in the data field and calculated on the basis of the control information CD and the CAN ID; and transmit the generated CAN frame to the first communication network 1. The CGW 7 receives the CAN frame(s) from the first communication network 1, generates an FD frame including a data field storing the CAN frame(s) and a CAN FD ID indicating that the CAN frame(s) are stored in the data field, and transmits the generated FD frame to the fifth communication network 5. The ECUs 52 to 54 of the fifth communication network 5 receive the FD frame from the fifth communication network 5, each acquire the CAN frame from the FD frame, and perform error detection on the CAN frame on the basis of the error detection code EC in the acquired CAN frame. As a result, each of the CAN frames stored in the FD frame has the error detection code EC calculated on the basis of the CAN ID and the control information CD, so that it is possible to perform error detection for each CAN frame and to perform appropriate vehicle control. Further, a CAN ID is not reassigned to any of the CAN frames, so that it is possible to prevent the evaluation level of ASIL from increasing.

Note that when a CAN frame is transmitted from the first communication network 1 to the fifth communication network 5 or the sixth communication network 6, a DM functioning as a relay device as with the CGW 7 may be used instead of the CGW 7 to generate an FD frame storing the CAN frame. For example, when a CAN frame is transmitted from the fifth communication network 5 to the sixth communication network 6, the DM 51 may generate an FD frame storing the CAN frame.

In the above embodiment, an example has been described in which an FD frame storing CAN frames is transmitted from one communication network to another communication network. However, the FD frame may be transmitted from one communication network to a plurality of other communication networks. Hereinafter, a case will be described in which control information is transmitted with a CAN frame, for example, from the ECU 32 of the third communication network 3 to the ECU 52 of the fifth communication network 5 and the ECU 62 of the sixth communication network 6.

Figure 7:
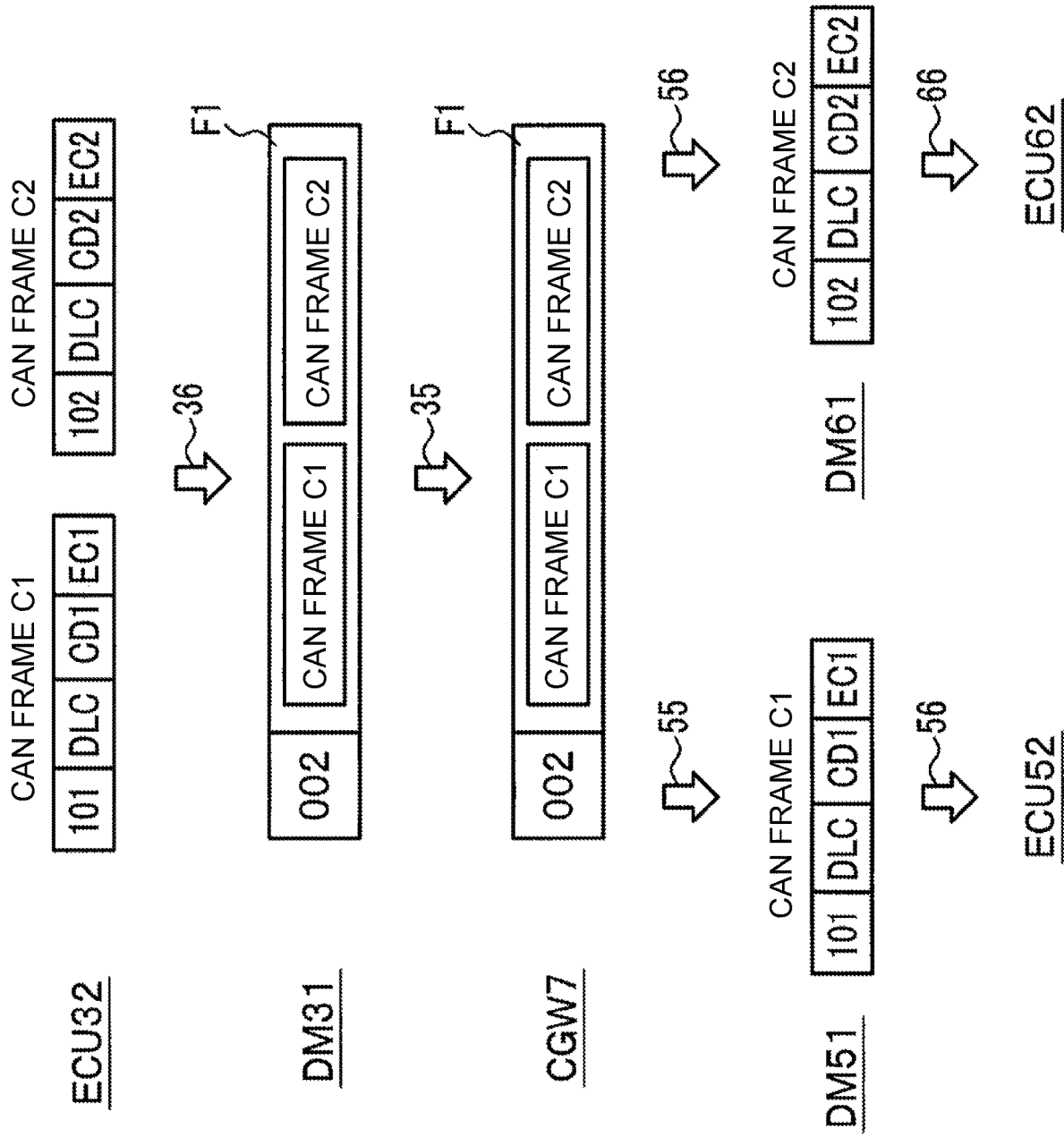
FIG. 7 is an explanatory diagram illustrating a procedure for transmitting an FD frame storing a CAN frame to a plurality of communication networks.

As illustrated in FIG. 7, the ECU 32 of the third communication network 3 generates control information CD1 to be transmitted to the ECU 52 and control information CD2 to be transmitted to the ECU 62 on the basis of the sensor information acquired from the sensors connected thereto. Further, the ECU 32 generates a CAN frame C1 in which the control information CD1 is stored in the data field and a CAN frame C2 in which the control information CD2 is stored in the data field. Note that a CAN ID "101" indicating the type of the control information CD1 is assigned to the CAN frame C1. Further, an error detection code EC1 calculated on the basis of the control information CD1 and a CAN ID "101" is stored in the data field of the CAN frame C1. A CAN ID "102" indicating the type of the control information CD2 is assigned to the CAN frame C2. Further, an error detection code EC2 calculated on the basis of the control information CD2 and the CAN ID "102" is stored in the data field of the CAN frame C2. The ECU 32 transmits the generated CAN frames C1 and C2 to the DM 31 via the FD bus 36.

The DM 31 receives the CAN frames C1 and C2 via the CAN bus 36. The DM 31 acquires only the "CAN ID 101", "DLC", "control information CD1", and "error detection code EC1" from the CAN frame C1, and acquires only the "CAN ID 102", "DLC", "control information CD2", and "error detection code EC2" from the CAN frame C2, to generate an FD frame F1 whose data field stores them. The DM 31 transmits the generated FD frame F1 to the CGW 7 via the FD bus 35.

The CGW 7 receives the FD frame F1 via the CAN bus 35. The CGW 7 transmits the received FD frame F1 to the DM 51 via the FD bus 55 of the fifth communication network 5, and transmits the received FD frame F1 to the DM 61 via the FD bus 65 of the sixth communication network 6. The DM 51 acquires the CAN frame C1 from the received FD frame F1 and transmits the CAN frame C1 to the ECU 52 via the CAN bus 56. Further, the DM 61 acquires the CAN frame C2 from the received FD frame F1 and transmits the CAN frame C2 to the ECU 62 via the CAN bus 66. In this way, the in-vehicle communication network system CNW of the present embodiment can transmit an FD frame storing CAN frames from one communication network to a plurality of other communication networks.

Figure 6:
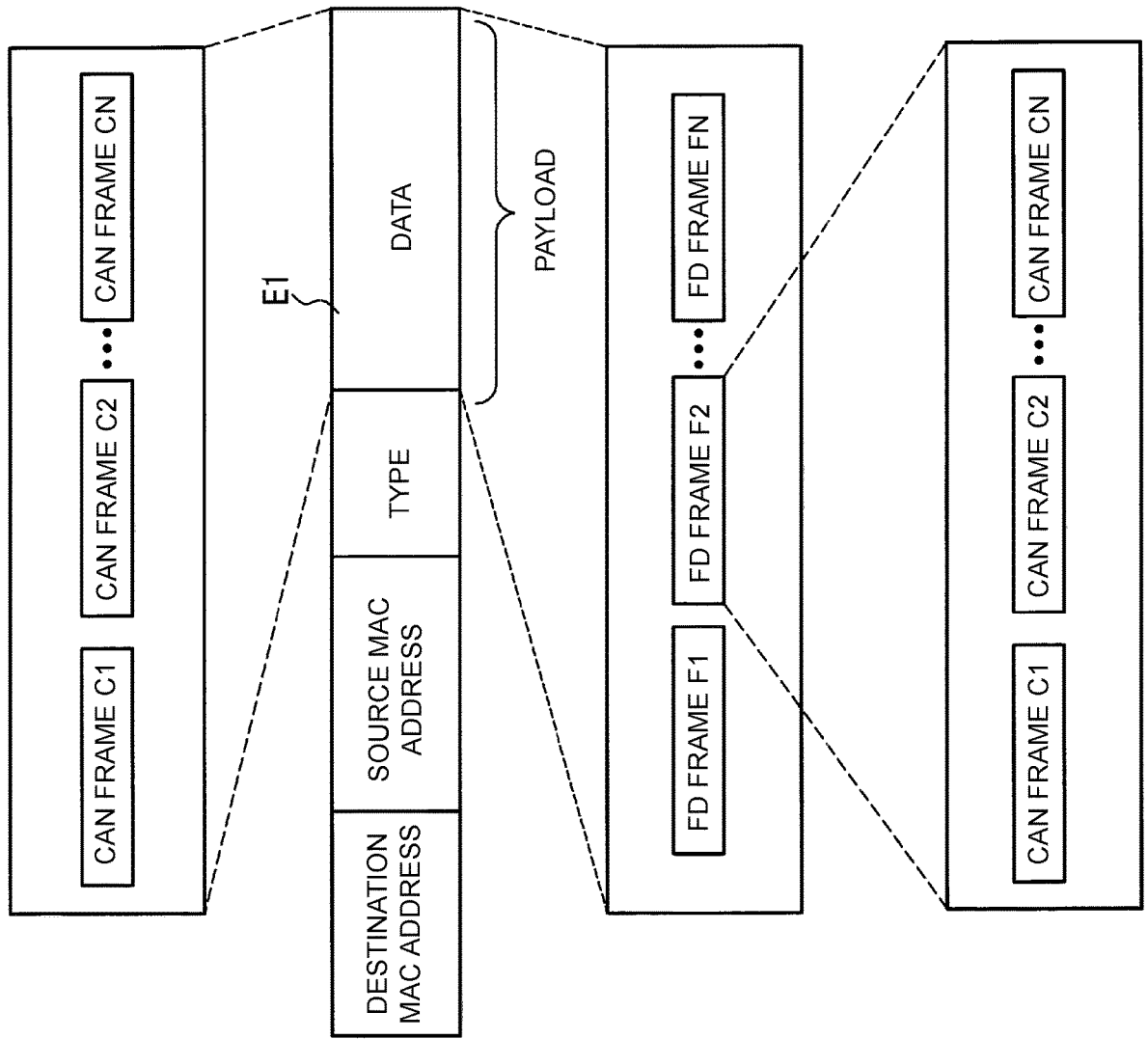
FIG. 6 is an explanatory diagram illustrating a structure of an Ethernet data frame.

Further, in the first embodiment, a case has been described in which the first communication network is CAN and the second communication network is CAN FD. However, the first communication network may be CAN or CAN FD and the second communication network may be Ethernet (registered trademark), which has a larger amount of data communication per unit time than CAN or CAN FD. In this case, as illustrated in FIG. 6, an Ethernet data frame (hereinafter, also referred to as Ethernet frame) E1 is transmitted whose payload stores at least one CAN frame, or at least one FD frame, or at least one FD frame storing at least one CAN frame. In this way, even in a communication network system in which Ethernet as well as CAN and CAN FD are mixed together, the ID of any CAN frame or FD frame is not reassigned, so that it is possible to prevent the evaluation level of ASIL from increasing.

DESCRIPTION OF REFERENCE NUMERALS

CNW In-vehicle communication network system
1 First communication network
11 to 13 ECU (Electronic Control Unit)
2 Second communication network
21 to 23 ECU
3 Third communication network
31 DM (Domain Master)
32 to 34 ECU 35, 36 FD bus
4 Fourth communication network
41 DM
42 to 44 ECU
45, 46 FD bus
Fifth communication network
51 DM
52 to 54 ECU
55 FD bus
56 CAN bus
6 Sixth communication network
61 DM
62 to 64 ECU
65 FD bus
66 CAN bus
7 CGW (Central Gateway)
C1 to CN CAN frame
F1 FD frame
E1 Ethernet frame

The invention claimed is:

1. A relay device connected to a first communication network and a second communication network, the second communication network using a second communication protocol different from a first communication protocol of the first communication network, wherein the relay device is configured to:
receive first data from the first communication network, the first data including a first payload storing control information to be transmitted from the first communication network to the second communication network, a first data ID for identifying the control information, and an error detection code stored in the first payload and calculated on a basis of the control information and the first data ID;
generate second data including a second payload storing a plurality of the first data each including the error detection code and a second data ID indicating that the first data is stored in the second payload; and
transmit the generated second data to the second communication network.

2. The relay device according to claim 1, wherein the first data is grouped on a basis of a destination in the second communication network, a type of the control information stored in the first data, or a transmission cycle from the first communication network, and is stored in the second payload for each of groups of the first data.

3. The relay device according to claim 1, wherein the first data includes information on a size of the control information stored in the first payload.

4. The relay device according to claim 1, wherein the second communication network has a larger amount of data communication per unit time than the first communication network.

5. The relay device according to claim 4,
wherein the first communication protocol used by the first communication network is Controller Area Network (CAN) protocol or CAN with Flexible Data rate (CAN FD) protocol, and
wherein the second communication protocol used by the second communication network is the CAN FD protocol or Ethernet (registered trademark) protocol for the CAN protocol used as the first communication protocol, and the Ethernet protocol for the CAN FD protocol used as the first communication protocol.

6. A communication network system comprising:
a first electric control unit connected to a first communication network;
a second electric control unit connected to a second communication network, the second communication network using a second communication protocol different from a first communication protocol of the first communication network; and
a relay device connected to the first communication network and the second communication network;
wherein the first electric control unit is configured to:
generate first data including a first payload storing control information to be transmitted to the second communication network, a first data ID for identifying the control information, and an error detection code stored in the first payload and calculated on a basis of the control information and the first data ID, and
transmit the generated first data to the first communication network,
wherein the relay device is configured to:
receive the first data from the first communication network,
generate a second data including a second payload storing a plurality of the first data each including the error detection code and a second data ID indicating that the first data is stored in the second payload, and
transmit the generated second data to the second communication network, and
wherein the second electric control unit is configured to:
receive the second data from the second communication network,
acquire the first data from the second data, and
perform error detection of the first data based on the error detection code of the acquired first data.

7. A communication control method to be executed by a relay device connected to a first communication network and a second communication network, the second communication network using a second communication protocol different from a first communication protocol of the first communication network, the method comprising:
receiving first data from the first communication network, the first data including a first payload storing control information to be transmitted from the first communication network to the second communication network, a first data ID for identifying the control information, and an error detection code stored in the first payload and calculated on a basis of the control information and the first data ID;
generating a second data including a second payload storing a plurality of the first data each including the error detection code and a second data ID indicating that the first data is stored in the second payload; and
transmitting the generated second data to the second communication network.

* * * * *